United States Patent [19]

McEntire

[11] Patent Number: 4,722,197

[45] Date of Patent: Feb. 2, 1988

[54] HIGH-EFFICIENCY, AMBIENT-ASSISTED, INTEGRATED HEATING AND COOLING SYSTEM

[75] Inventor: Byron McEntire, Redondo Beach, Calif.

[73] Assignee: M&H Research & Development Corp., Salt Lake City, Utah

[21] Appl. No.: 746,174

[22] Filed: Jun. 18, 1985

[51] Int. Cl.⁴ .................... G05D 23/00; F25B 27/00
[52] U.S. Cl. .................... 62/235.1; 237/2 B; 62/324.1; 62/196.4
[58] Field of Search ............ 62/235.1, 324.1, 324.6, 62/238.6, 160, 196.4, 197, 198, 199; 237/2 B

[56] References Cited

U.S. PATENT DOCUMENTS

| | | | |
|---|---|---|---|
| 4,065,938 | 1/1978 | Jonsson | 62/235.1 |
| 4,093,024 | 6/1978 | Middleton | 165/170 |
| 4,308,723 | 1/1982 | Ecker | 62/235.1 |
| 4,313,314 | 2/1982 | Boyanich | 62/324.6 |

*Primary Examiner*—Henry A. Bennet

[57] ABSTRACT

A closed, high-efficiency, ambient-energy-assisted heating and cooling system incorporating a unidirectional flow of refrigerant to achieve simultaneously the functions of space and water heating and/or cooling is described, along with an improved ambient-energy collector panel to be used in conjunction therewith.

13 Claims, 5 Drawing Figures

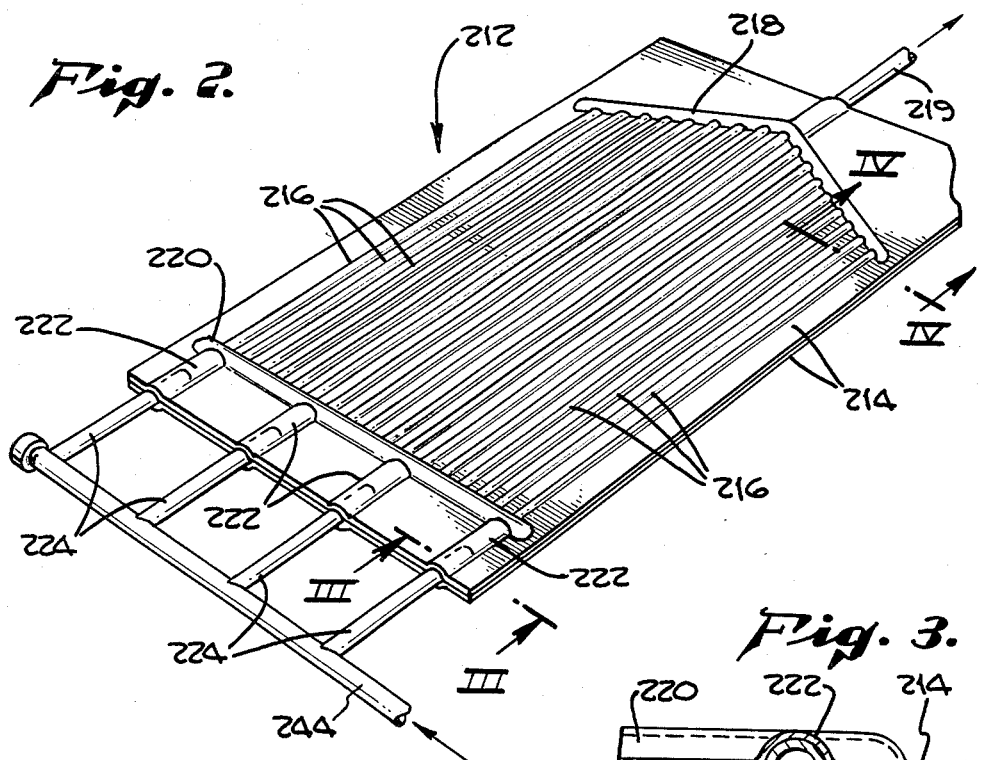
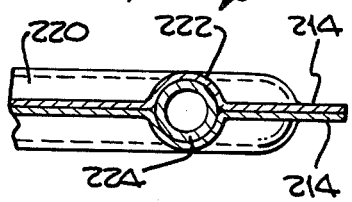
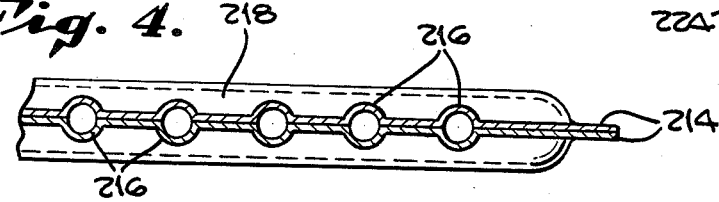
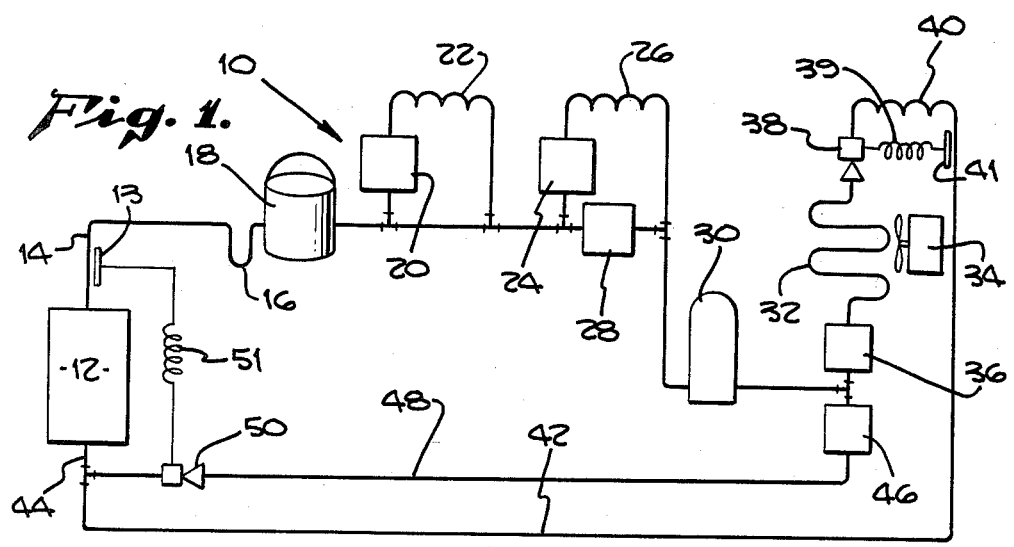

HIGH-EFFICIENCY, AMBIENT-ASSISTED, INTEGRATED HEATING AND COOLING SYSTEM

BACKGROUND OF THE INVENTION

1. Field of the Invention

This invention pertains, in general, to the field of refrigeration and air conditioning, and more particularly, to an integrated, ambient-energy-assisted system for water and space heating and cooling purposes.

2. Summary of the Prior Art

Many heating and cooling systems have been designed in recent years which rely partly or wholly on solar radiation for their energy input. Such systems may be divided into two general categories:

One wherein a fluid is circulated through a solar collector or receiver where it absorbs heat which is then transferred by means of a heat exchanger to another fluid, e.g., water for domestic use, or to a thermal storage medium such as low temperature melting salts, etc.

The second general category of heating systems use a low temperature boiling point working fluid or refrigerant which undergoes a thermodynamic cycle, including evaporation in the solar panel, superheating by compression, and condensation in a heat exchanger. An example of the latter type is shown in U.S. Pat. No. 4,392,359 to Franklin. A still further example of the second type of system is shown by Charters, et al., in U.S. Pat. No. 4,302,942.

Many variations on the above two types of systems are known, including hybrid systems which combine the aforementioned two general approaches, such as that disclosed by Ecker in U.S. Pat. No. 4,308,042. The known systems further differ in the working fluids and refrigerants used, among other points of differentiation.

Existing heat pump systems can provide both heating and cooling by use of a so-called "reversing valve" to reverse the flow of refrigerant through the system, and thereby switch from a heating mode to a cooling mode. For example, in the heating mode, a solar collector panel operates as the evaporator in which is heated a refrigerant fluid, while the heat exchanger coil works as the condenser where the hot refrigerant heats air or water. By reversing the flow of refrigerant, the air heating coil can be made to operate as the evaporator, absorbing heat from the interior air in an enclosure. The heat is dissipated through the exterior solar panel to the outer atmosphere, the panel now operating as the condenser.

A major shortcoming of such prior art systems has been the inability to provide simultaneous heating and cooling. A typical residential site has a steady requirement for hot water in addition to either heating or cooling of the interior air space. The requirement of heat input to a water heating system simultaneously with a cooling requirement of the interior space could not be met by any of the known, relatively-simple heating/cooling systems. Even disregarding the inability to meet simultaneous heating and cooling requirements, conventional heat pump systems relying on reversing valves to alternate operating modes often suffered from reliability problems and shortened component lifetimes due to the additional stress imposed on the components by the flow reversals and consequent reversing pressure differentials imposed on the various system components. Still further, the use of reversing valves adds to the complexity and cost of the system.

SUMMARY OF THE INVENTION

It is therefore an object of the present invention to provide a reliable, relatively simple and inexpensive integrated heating and cooling system which does not require a reversing valve, which is capable of meeting both heating and cooling requirements simultaneously, and which operates at a high overall efficiency to maximize heat transfer for a given energy input to the system.

These and other objects of the present invention are preferably accomplished in an ambient-energy-assisted, integrated heating and cooling system which is characterized by its ability to meet simultaneously both the heating and cooling requirements, for example, of an average home while maintaining at all times a unidirectional flow of refrigerant through the system, thus dispensing with any need for a flow reversing valve.

The heating/cooling system of this invention includes an exteriorly-mounted panel to collect ambient energy, including incident solar energy, which is provided with refrigerant inlet and outlet manifolds. A compressor is connected to the panel outlet for compressing refrigerant heated in the collector panel. First and second heat exchangers are connected in parallel arrangement to receive hot refrigerant from the compressor, and both heat exchangers are connected to return the refrigerant through an expansion valve to the collector panel inlet. The expansion valve is connected for sensing, and is responsive to, the temperature of refrigerant flowing out of the collector outlet so as to regulate the flow of refrigerant into and through the collector panel under varying ambient temperatures and conditions of ambient energy incident upon the panel, both of which effect the degree of heating of the refrigerant in the panel. The first heat exchanger may be one or more water heating coils, while the second heat exchanger may be an air heating coil. The refrigerant output from the water heating coil flows through a liquid refrigerant receiver, and then through a precooler coil, where excess heat still carried by the refrigerant is dissipated prior to returning the refrigerant to the collector panel.

The output of the precooler is also connectable by way of a solenoid valve through a second expansion valve to the input of a third heat exchanger which serves a cooling function, as opposed to the heating function served by the first and second heat exchangers. Refrigerant flows through the second expansion valve into the third heat exchanger, where it undergoes decompression. The refrigerant, which has already yielded its heat content in the first and/or second heat exchangers, and was further cooled in the precooler, now undergoes a further rapid and substantial drop in temperature as a result of expansion through the second expansion valve. The refrigerant which thus flows through the third heat exchanger is cold and can readily absorb heat from, e.g., inside air blown across the third heat exchanger, which in such case functions as an air cooling coil. The refrigerant output of the third heat exchanger is returned directly to the input of the collector panel, bypassing the first expansion valve.

The system is provided with valves for controlling refrigerant flow through each of the heat exchangers selectively, according to the heating and cooling requirements of the moment. For example, solenoid control valves may be controlled by suitable thermostatic devices for independent selection of any combination of the three heat exchangers, thus meeting heating and cooling requirements simultaneously, all while maintaining unidirectional refrigerant flow.

A novel feature of the present invention includes the use of a single, simply-fabricated ambient energy absorbing panel which is optimized for the particular working fluid and anticipated energy transfers to the closed system.

The system of this invention further incorporates a number of other novel features, including the use of a particular refrigerant, the relative dimensions of certain conduits, and still other features as will be described below, which enable the present system to operate in a highly energy-efficient manner, while providing the aforementioned advantages.

Yet another new and useful aspect of the invention is its use, in an integrated heating/cooling system, of a cycle characterized by first circulating hot refrigerant to a heating load, and then expanding the cooler, but still pressurized, refrigerant in a cooling load, thus simultaneously providing functions of both heating and cooling.

These and other objects and advantages will become evident to those skilled in the art from a consideration of the following detailed description in conjunction with the drawings.

DESCRIPTION OF THE DRAWINGS

FIG. 1 is a simplified, schematic flow diagram of an integrated heating/cooling system constructed according to the present invention.

FIG. 2 illustrates a preferred evaporator panel construction for a heating/cooling system in accordance with the present invention.

FIG. 3 is a sectional view taken through the panel, as revealed by the section III—III taken in FIG. 2.

FIG. 4 is another sectional view taken through the panel, as revealed by the section IV—IV taken in FIG. 2.

DESCRIPTION OF THE PREFERRED EMBODIMENT

Figure 5:
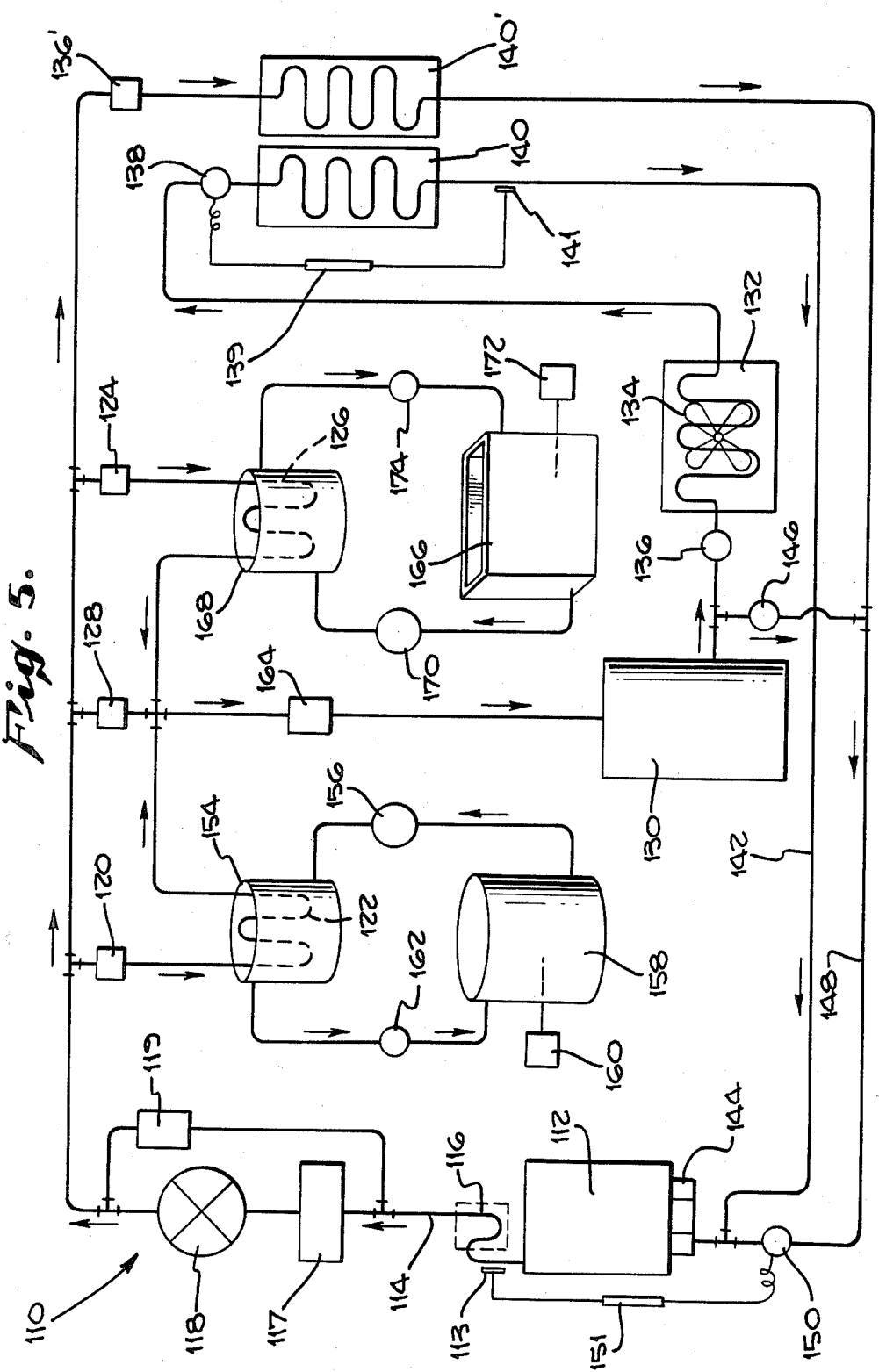
FIG. 5 is a more detailed schematic diagram of an integrated heating/cooling system for a typical domestic installation, in accordance with the present invention.

With reference to the drawings, FIG. 1 shows, in basic form, the integrated heating/cooling system 10 including an ambient energy absorbing panel 12, which is installed exteriorly to an enclosed space served by the system, and preferably oriented so as to maximize the average solar radiation incident upon and absorbed by the panel 12. The outlet 14 of the panel 12 is connected to a compressor 18 through oil trap 16. The compressor output is connected to first and second parallel heat exchangers or condensers 22 and 26, which are heating loads such as water heating coils in a domestic installation.

A refrigerant fluid is heated to a gaseous state in panel 12 and further heated and compressed to a liquid state in compressor 18. The hot liquid flows through the heat exchanger coils 22 and/or 26 through solenoid valves 20 and 24 respectively, where it is placed in heat exchanging contact with heating loads, e.g., cooler water which is thus heated by absorbing heat from the refrigerant flow. The outlet of the heat exchangers 22 and/or 26 flows into a hot liquid receiver tank 30.

Receiver 30, in turn, is connectable through solenoid valve 36 to a precooler 32, which preferably is air-cooled by fan 34. The working fluid, thus cooled, flows through expansion valve 38 at the inlet of a third heat exchanger coil 40. The liquid refrigerant expands and vaporizes in the valve 38, with a consequent substantial drop in the temperature of the refrigerant gas which then flows through the heat exchanger 40. The cold refrigerant is then able to absorb heat from a medium such as a stream of inside air placed in heat exchanging contact with the surface of heat exchanger 40. The outlet from heat exchanger coil 40 is connected through a low-pressure return line 42 to the refrigerant inlet 44 of evaporator panel 12 where the gaseous refrigerant is again heated.

A high pressure return conduit 48 is also connectable to the outlet of receiver 30 by means of solenoid valve 46 so as to permit the direct return of refrigerant from the receiver 30 through an expansion valve 50 to the inlet 44 of evaporator panel 12. Solenoid valves 36 and 46 thus are provided to direct selectively the refrigerant flow from receiver 30 either through the cooling leg, including third heat exchanger 40, by closing valve 46 and opening valve 36, or for returning the liquid refrigerant directly to the collector 12 by closing valve 36 and opening valve 46, in order to satisfy a cooling requirement in the first case and to bypass the third heat exchanger in the second case, if no cooling requirement exists.

Each condenser coil is associated with a valve which opens or closes the coil to refrigerant flow as needed to meet the energy requirements of the installation. Thus, coil 26 is in series with valve 24 and in parallel connection with valve 28. One of the valves is always open, while the other is closed, either to direct the refrigerant through coil 26 or to bypass it. Valves 36 and 46 operate in a similar fashion in connection with cooling coil 40, as has been described above.

Valve 20 directs refrigerant flow either through or around coil 22. When valve 28 is opened and valves 20 and 24 are closed, the refrigerant bypasses both condenser coils 22 and 26. In this mode of operation, liquid refrigerant flows only through the cooling coil 40, in the absence of a heat requirement at the heating coils 22 and 26. While the refrigerant flowing into the expansion valve 38 will thus be hotter because it has not had the opportunity to give up heat through the heating coils, some heat is removed by precooler 32, and a cooling function is nonetheless obtained in heat exchanger 40 at a somewhat reduced efficiency than would be the case were the refrigerant to transfer heat to a heating load prior to expansion valve 38.

The system of FIG. 1 includes an oil trap 16 connected between the panel outlet 14 and the inlet to compressor 18. The provision of the oil trap ahead of compressor 18 overcomes a compressor overload problem common in existing heat pump systems caused by liquid oil flowing into compressor 18 which is designed to operate on a finely-divided mixture of oil and refrigerant. Liquid oil is substantially incompressable and, unless trapped, will overload the compressor, eventually causing its premature failure.

The system shown in FIG. 1 has been simplified to facilitate understanding of the general principles of the novel system by which both heating and cooling are provided while maintaining a unidirectional flow of refrigerant within the system, a more detailed description of which now follows.

Turning now to FIG. 5, there is shown in schematic form a more complete heating/cooling system 110 which includes the basic system 10 of FIG. 1 such that the common elements have the same numbering, plus 100.

A vaporized Freon/oil mixture is is heated in the ambient energy absorber panel 112, which is mounted in a generally upright attitude such that the inlet 144 is at the bottom of the panel, and outlet 114 is at the top. The oil/Freon flows from the panel 112 through a one-half inch outlet which connects to the inlet of compressor 118 through at $\frac{7}{8}$" suction line 114. The temperature of the gas flowing through the line 114 is sensed by a sealed bulb 113 in thermal contact with line 114 and connected by a capillary 151 to a variable orifice in expansion valve 150. Gas within the bulb 113 expands or contracts according to the temperature of the refrigerant in outlet 114, and through the capillary connection 151 varies the dimensions of the expansion orifice in valve 150, thus controlling refrigerant flow through panel 112. The enlarged inner diameter of the suction line 114 relative to the $\frac{1}{2}$" panel outlet operates to stabilize gas flow into the compressor 118, and thereby maximizes system efficiency.

A filter-dryer 117 removes moisture and particulate matter from the refrigerant prior to entering compressor 118.

The gas is compressed to a liquid state in compressor 118, and the hot liquid flows out of the compressor 118 into a $\frac{3}{8}$" line. A fail-safe, pressure-sensitive switch 119 is connected across the compressor 118, and operates to cut power to the system in the event of insufficient pressure across the compressor 118.

As stated, the transition from a $\frac{1}{2}$" diameter outlet at panel 112 into a $\frac{7}{8}$" suction line 114 to compressor 118 creates a Venturi effect, which increases the flow velocity of refrigerant at the transition, stabilizing the operating pressure of the system, and increases compressor efficiency. The combination of heating in panel 112 and the aforementioned pressure change increase the suction pressure in line 114, which minimizes the load on compressor 118, thus reducing the energy consumed by compressor 118 and extending its service life expectancy.

Compressor 118 may be a rotary, centrifugal, hermetic or screw-type compressor. In the preferred embodiment, a rotary compressor 118 with a ceramic head is utilized, which draws approximately 4 amperes at 120 Vac in operation. This level of power consumption is approximately one-half of that drawn by typical compressors presently used in the most closely comparable water and air heating systems.

The refrigerant is exhausted from compressor 118 as a liquid into a $\frac{3}{8}$" line, where it is connectable through solenoid valve 136' into heat exchanger coil 140', which, in the particular embodiment illustrated in FIG. 5, is an air heating coil, i.e., a blower forces air over the coil 140' surface to extract heat from the refrigerant flowing therethrough, in a manner well known in the art. The liquid refrigerant flows out of the coil 140' at a lower temperature into a $\frac{3}{8}$" line for return to panel 112 through expansion valve 150.

Expansion valve 150 may have either a fixed or an adjustable orifice, where the liquid refrigerant undergoes a rapid pressure drop, as a result of which it vaporizes and also undergoes a substantial reduction in its temperature. The vaporized refrigerant then flows into the intake manifold of the panel 112, from which it is distributed through parallel vertical passages, where it is heated by absorption of solar radiation and/or heat taken from the environment, and is then collected by the exhaust manifold at the top of the panel to repeat the aforedescribed cycle.

The domestic water heating cycle in the system of FIG. 5 includes a $\frac{3}{8}$" line connected to the compressor 118 through which the liquid refrigerant is connectable through solenoid valve 120 into a $\frac{5}{8}$" opening into condenser coil 122, a water heating coil immersed in a heat exchanger 154. A circulating pump 156 directs water from insulated storage tank 158 through a $\frac{3}{4}$" line into heat exchanger 154. The temperature of the water in storage tank 158 is measured by aquastat 160 which electrically controls the pump 156 and the condition of solenoid valve 120, i.e., if the water temperature falls below a preset level, pump 156 is turned on and valve 120 is opened to admit hot refrigerant liquid through the heat exchanger coil 122, so as to heat the water circulating through heat exchanger 154 to the desired temperature level, at which point the valve 120 closes and pump 156 turns off under the control of aquastat 160. Heated water flows out of exchanger 154, past check valve 162 and into the insulated storage tank 158 for storage until use.

The refrigerant, cooled by its contact with the heated water, flows out of condenser coil 122 into a $\frac{3}{8}$" line to a dryer/filter 164, into the liquid receiver 130, and then, in a cooling mode, into the precooler coil 132. As the refrigerant flows through the precooler coil 132, it is further cooled by a fan 134 driven by a small electric motor. The fan motor may be as small as 1/180 horsepower so as to consume a very small amount of electrical energy.

In the absence of any cooling requirement, the cooling leg, including precooler 132 and cooling coil 140, are bypassed by solenoid valve 146, which returns the liquid refrigerant directly to panel 112 through high pressure return line 148 and expansion valve 150.

The water heating system FIG. 5 further includes a heating circuit suitable for water heating in a pool or spa 166. The system incorporates a solenoid valve 124, which controls refrigerant flow through a $\frac{3}{8}$" opening into the coil of condenser 126 contained within heat exchanger 168. The $\frac{5}{8}$" enlarged inner diameter of the condenser coil 168, relative to the $\frac{3}{8}$" diameter refrigerant feed line in the pool/spa water heating circuit, effectively slows down the flow velocity of the liquid refrigerant through the water heating coil 126, thus allowing for improved thermal exchange between the refrigerant and the water. Circulating pump 170 directs water through a $\frac{3}{4}$" line from the pool or spa 166, where the water temperature is monitored by aquastat 172. Aquastat 172 controls both the solenoid valve 124 and circulating pump 170, so as to admit refrigerant through coil 126 of exchanger 168 and to actuate pump 170 when additional water heating is required, and to close valve 124 and deactivate pump 170 in the absence of such requirement. The water circulates out of the pool or spa 166 through check valve 170.

As before, the cooled refrigerant exits the condenser coil 126 and flows through a $\frac{3}{8}$" outlet, where it follows the refrigerant cycle already described in connection with the water heating circuit described above.

The air-conditioning circuit of the embodiment illustrated in FIG. 5 includes a $\frac{3}{8}$" line from compressor 118 directly connectable to the inlet of liquid receiver 130. Solenoid valve 136 then permits liquid refrigerant selectively to flow through precooler 132 and into expansion valve 138, where the refrigerant liquid is vaporized and thus drops substantially in temperature. The vaporized refrigerant flows into the cooling coil 140, where the air-conditioning function is carried out by forced air blown over the surface of cooling coil 140 such that the vaporized, cold refrigerant absorbs heat from the warmer forced air. As the refrigerant vapor flows out of the cooling coil 140 and into the ⅜" line, it flows by bulb sensor 141 in thermal contact with the refrigerant flowing through the outlet cooling coil 140. The sensor 141 controls the opening of the variable orifice in expansion valve 138 through a capillary connection 139 in a manner well known in the art. The low pressure return line 142 then returns the refrigerant directly to the inlet 144 of energy absorbing panel 112, bypassing the expansion valve 150, which is not required since the returning refrigerant is already vaporized by its passage through heat exchanger 140.

As may be seen from FIG. 5, the input of refrigerant to the cooling leg, comprising precooler 132, expansion valve 138 and cooling coil 140, may include refrigerant precooled in water heating coils 122 and/or 126, as well as hot liquid refrigerant flowing directly from compressor 118. Those skilled in the art will recognize that the efficiency of the system is enhanced when both heating and cooling loads coexist.

Illustrated in FIG. 2 is a preferred embodiment of the ambient energy absorbing panel 212 that is particularly contemplated to be part of the present invention. The panel or evaporator 212 consists of two identical sheets 214 of black-anodized aluminum alloy brazed, bonded or welded back-to-back to define a rectangular panel approximately 3'×5' in size. The two sheets 214 of panel 212 are hydroformed or stamped with semi-circular corrugations to define forty-three parallel passages 216, each ⅜" in diameter, which terminate at their upper, outlet ends into an inverted V-manifold 218 which is 1" in diameter, which is formed into the sheets 214. The ½" refrigerant outlet 219 of panel 212 discussed above is connected to manifold 218 at its apex. This particular outlet manifold configuration allows pressure equalization at the top of the parallel tubes 216, and thus promotes equalized refrigerant flow through each of the tubes 216 for maximum heat absorption through the panel 212.

The vertical tubes 216 are connected at their lower, inlet ends by a 1" diameter, horizontal manifold 220 formed into the sheets 214 to which are connected four, equally-spaced, ½" diameter inlet lines 222, also formed into the sheets 214, each of which is fed by a ½" diameter inlet tube 224. This inlet manifold design similarly encourages an even distribution of refrigerant flow across the panel 212 through the individual vertical tubes 216 for optimum heat absorption. Panel inlet line 244 connects in parallel with inlet tubes 224 and is sloped slightly with respect to gravity to permit lubricating oil or other condensates to drain from panel 212.

The evaporator panel 212 constructed in the aforedescribed manner weighs approximately 20 lbs., and its light weight allows for great flexibility in its installation. The panel can, for example, be hung from a vertical exterior wall of a building, if desired.

Returning now to the system illustrated in FIG. 5, it is to be noted that the entire system can be controlled and regulated to achieve maximum efficiency by a suitable controller incorporating microprocessor techniques, which monitors all heating and cooling requirements of the system. As demands on individual heating and cooling functions are satisfied, the corresponding solenoid valves close and open under the direction of the controller, so as to close refrigerant flow to those parts of the system not in use.

The choice of refrigerant for use in the aforedescribed integrating heating/cooling system is particularly and distinctly considered to be an important part of the present invention. The presently preferred refrigerant is a synthesized working fluid commercially available under the designation "Freon 502". "Freon" is a registered trademark of the E. I. Du Pont De Nemours & Co., Inc. While this refrigerant has been commercially available since about 1961, its use in the past has been limited to larger commercial installations, such as walk-in freezers, and is not known by this applicant have found widespread application in solar assisted heating/cooling systems such as disclosed herein, and particularly in smaller-capacity systems adapted for typical domestic requirements.

Freon 502 has a lower boiling point than other working fluids presently used in space heating/cooling systems, and has been found to yield a marked increase in the energy efficiency of the system. The refrigerant enters the collector panel 12 of the system at a temperature estimated at minus 55° F., and is thus able readily to absorb heat, not only from solar radiation incident upon the panel surface, but equally as well from the surrounding air, regardless of solar conditions. In particular, the present system is believed capable of extracting heat from the atmosphere at temperatures as low as minus 55° F. The superior thermal characteristics of the 502 Freon enable a reduction in the size of absorber panel 112, and also a reduction in the capacity, and therefore energy consumption, of compressor 118. Thus, in a typical system such as illustrated in FIG. 5, the total energy consumption of the system is approximately 1645 watts for compressor 118, plus a very small amount of energy required by the 1/180 horsepower blower of precooler 132.

It has been found that a system constructed in accordance with the present invention is capable of providing all the energy of a typical household for both water heating and space heating or cooling. If desired, all three functions can be performed simultaneously. It will be appreciated that the heating and cooling functions are carried out in the present system in an integrated manner which is complimentary in the sense that, the greater the heat requirement imposed upon the system, the more efficient will be the cooling function performed simultaneously therewith. This is because the greater the amount of heat extracted from the liquid refrigerant flowing in the heating coils 122 and/or 126, the cooler the refrigerant will be at the expansion valve 138 and cooling coil 140. Thus, an air-conditioning or other cooling function is obtained at minimal energy cost and almost incidentally to a heating function.

In actual tests conducted with the system 110 constructed in accordance with the present invention, during a day when outside air temperature was 83° F. with overcast skies, a 35 gallon water tank was heated from an initial water temperature of 60° F. to 90° F. in 15 minutes. The water temperature in the tank was further increased to 140° F. in an additional 30 minutes. In a further test conducted with collector panel 112, covered so as to block direct solar radiation, whereby heat was extracted only from the ambient atmosphere, the temperature of the water in the tank was raised from 60° F. to 147° F. in 90 minutes.

In a further test of the air heating capacity of the above system 110 conducted on an overcast day with an outside air temperature of 80° F., air blown across the air heating coil 140' at a rate of 1300 CFM reached a steady-state temperature of 145° F. after 15 minutes of system operation.

In another test of the air cooling capacity of the system 110 conducted at an outside air temperature of 83° F., air blown across the cooling coil 140 at the rate of 1300 CFM was measured to have a steady-state temperature of 38° F. after a 15-minute interval of system 110 operation. This test was conducted with a cooling coil 140 normally used for commercial walk-in freezers, rather than a more suitable air-conditioning coil. It is believed that system 110 performance will improve markedly with a proper air cooling coil 140 installed in the system.

It is to be noted that the foregoing system is appropriately sized for an average domestic, residential application, and therefore incorporates only a single panel 112 and a one-ton compressor unit 118. However, it is anticipated that if a standard two-ton compressor were to be utilized operating at 240 Vac in conjunction with 2 or 3 panels, an even more efficient, higher-capacity system could be easily implemented for domestic, commercial or industrial use.

Similarly, it is to be noted that, because of the small size and light weight of the system described herein, it is one that lends itself readily to more mobile installations, e.g., mobile homes and campers or refrigerated tractor-trailers or airliners, in which the collector panel may be incorporated directly into the exterior skin of the vehicle.

Therefore, while particular capacities, dimensions and conduit diameters have been given, these are for purposes of illustration only, and not by way of limitation, and those skilled in the art will readily recognize that given dimensions may be adjusted so as to suit the need for greater or lesser system capacities, depending upon the application.

I claim:

1. A closed, ambient-energy-assisted system for heating and refrigeration with unidirectional refrigerant flow, comprising:

ambient energy collector means for collecting heat energy from the ambient and exchanging said ambient heat to said refrigerant to produce a super-heated, gaseous refrigerant;

compressor means downstream of said collector means for compressing said super-heated, gaseous refrigerant to a heated liquid refrigerant;

first heat exchanger means downstream of said compressor means for exchanging heat from said heated liquid refrigerant to a heating load;

precooler means downstream of said first heat exchanger means for exchanging heat from said heated liquid refrigerant to outside air for precooling said liquid refrigerant before said liquid refrigerant is expanded for cooling;

first expansion valve means downstream of said precooler means for expanding said precooled liquid refrigerant to a gas, whereby said expanded refrigerant is chilled;

second heat exchanger means downstream of said first expansion valve and upstream of said collector means for exchanging heat from a cooling load to said chilled refrigerant;

second expansion valve means for expanding said liquid refrigerant, connectable downstream of said first heat exchanger and upstream of said collector means and in parallel with said precooler means, said first expansion value means and said second heat exchanger means; and first selector valve means for selectively directing said refrigerant, responsive to a cooling load demand, to direct said hot liquid refrigerant from said first heat exchanger means to said precooler means in response to a cooling load demand and to direct said hot liquid refrigerant to said second expansion valve means otherwise, whereby said precooler means, said first expansion valve means and said second heat exchanger means are bypassed.

2. The system of claim 1, further comprising:

shunt means, connectable in series between said compressor means and said first selector valve means; and second selector valve means for selectively directing flow of said refrigerant, responsive to a heating load demand, to direct said liquid refrigerant from said compressor means to said first heat exchanging means in response to a heating load demand, and to direct said liquid refrigerant to said first selector valve means otherwise, whereby said first heat exchanger means is bypassed.

3. The system of claim 2, further comprising:

means for automatically sensing heating and/or cooling load demands upon said system and for activating said system and controlling said selector valve means for directing said refrigerant to said heating and/or cooling loads in response to said demands, and for deactivating said system otherwise.

4. The system of claim 3 wherein:

said first heat exchanger means further includes at least one means for exchanging heat from said refrigerant to water; and said second heat exchanger means further includes at least one means for exchanging heat from inside air to said chilled refrigerant.

5. The system of claim 4, wherein:

said first heat exchanger means further includes at least one means for exchanging heat from said refrigerant to inside air.

6. A closed, ambient-energy-assisted heating and refrigeration circuit having a unidirectional flow of refrigerant, comprising:

ambient energy collector means mounted exteriorly for collecting ambient heat from solar radiation and the ambient air and for transferring said ambient heat to said refrigerant to heat said refrigerant to a superheated gas;

compressor means connected in series with said collector means to receive and compress said super-heated refrigerant to a heated liquid;

a heating leg connected in series with said compressor means to receive said compressed refrigerant, which includes:

at least one first heat exchanger means connectable in series with said compressor means to transfer heat from said heated liquid refrigerant to a heating load;

shunt means connectable in series with said compressor means and in parallel with said first heat exchanger means to bypass said first heat exchanger means in the absence of a heating load;

first selector valve means connected in series between said compressor means and said heating leg, responsive to heating load demand, to direct said heated liquid refrigerant from said compressor means to said first heat exchanger means in response to a heating load demand, and to said first shunt means in the absence thereof, whereby said first heat exchanger means is bypassed;

first expansion valve means connectable in series between said heating leg and said collector means, said first expansion valve means further including means for sensing the temperature of said refrigerant leaving said collector means and a variable orifice means, responsive to said exit temperature, for varying the flow of said refrigerant therethrough to regulate the flow of said refrigerant returning from said heating leg through said first expansion valve means to said collector means;

a cooling leg, connectable in series between said heating leg and said collector means and in parallel with said first expansion valve means, which includes, in series:

precooler means for transferring heat from said liquid refrigerant to outside air to precool said refrigerant before expansion;

second expansion valve means for expanding said precooled liquid refrigerant to chill said refrigerant;

at least one second heat exchanger means to transfer heat from a cooling load to said chilled refrigerant;

said second expansion valve means further including means for sensing the temperature of said refrigerant leaving said second heat exchanger means and variable orifice means responsive to the exit temperature sensed to vary the flow of said refrigerant therethrough, to regulate the flow of said refrigerant coming from said heating leg through said second expansion valve means to said second heat exchanger means; and second selector valve means connected in series between said heating leg and said cooling leg, responsive to cooling load demand, to direct heated liquid refrigerant from said heating leg to said cooling leg in response to a cooling load demand, and to said first expansion valve means in the absence thereof, whereby said cooling leg is bypassed.

7. The circuit of claim 6, further comprising:
liquid refrigerant receiver means connected between said heating leg and said second selector valve means to receive said liquid refrigerant.

8. The circuit of claim 6, wherein:
said precooler means further includes a means for forcing outside air in heat-exchanging contact with said precooler.

9. The circuit of claim 6, further comprising:
means for automatically sensing heating and/or cooling load demands upon said circuit and for activating said circuit and controlling said selector valve means to direct said refrigerant to said heating leg and/or said cooling leg in response to said demands, and for deactivating said system otherwise.

10. The circuit of claim 6, wherein:
said heating leg further includes at least one heat exchanger means for heating water; and
said cooling leg further includes at least one heat exchanger means for cooling inside air.

11. The circuit of claim 10, wherein:
said heating leg further includes at least one heat exchanger means for heating inside air.

12. The system of claims 1 or 6, wherein said refrigerant comprises:
a mixture of finely-dispersed lubricating oil and an azeotropic mixture of $CHClF_2$ and $CClF_2CF_3$ having a boiling point of minus 50° F. at atmospheric pressure.

13. The system of claim 12, wherein said refrigerant further comprises:
Freon 502.

* * * * *